April 10, 1962  D. A. MARSH  3,028,970

CRYSTAL SEPARATION AND PURIFICATION

Filed Aug. 21, 1958  3 Sheets-Sheet 1

INVENTOR.
D.A. MARSH

BY *Hudson and Young*

ATTORNEYS

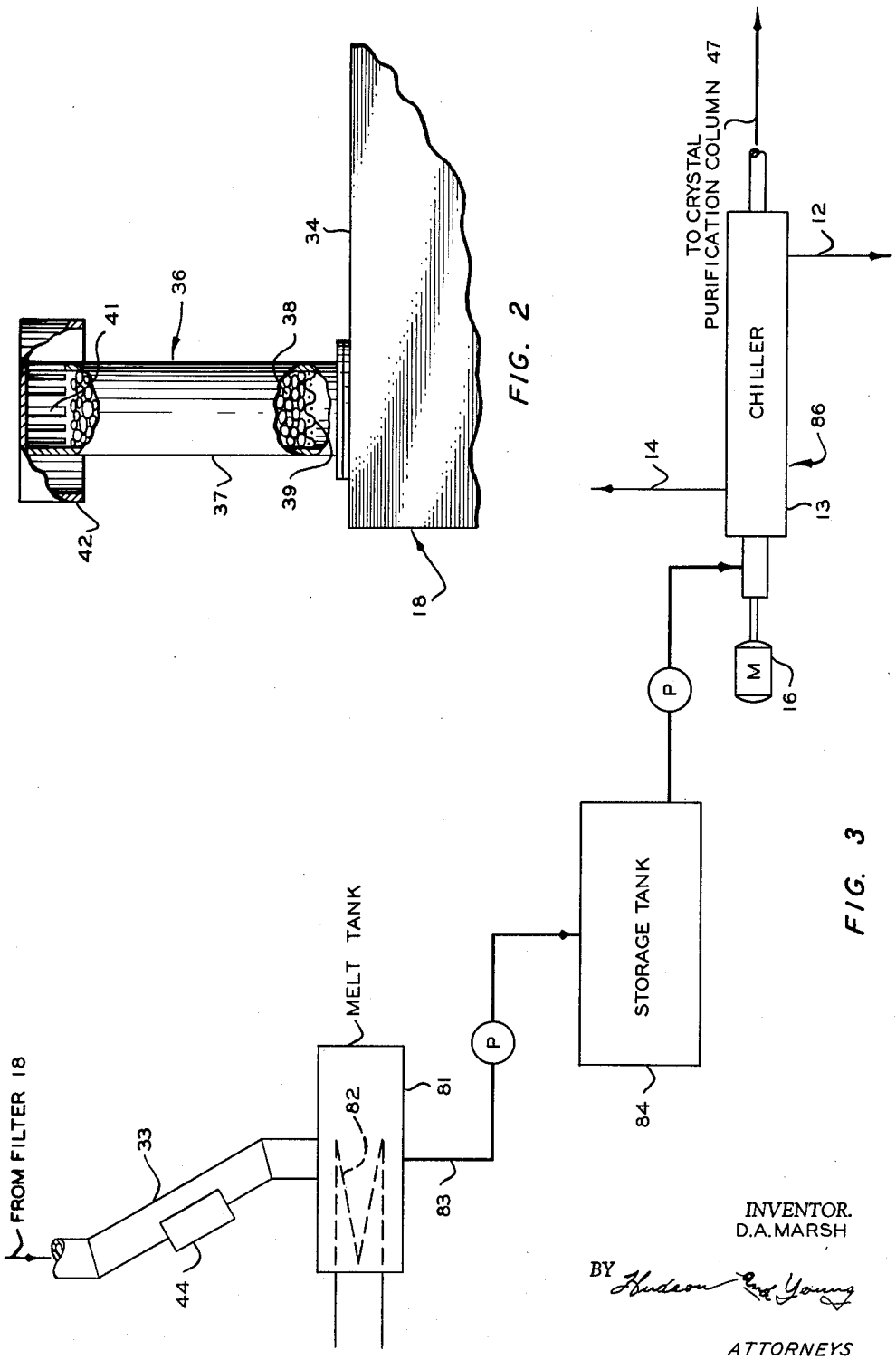

April 10, 1962   D. A. MARSH   3,028,970
CRYSTAL SEPARATION AND PURIFICATION
Filed Aug. 21, 1958   3 Sheets-Sheet 3

INVENTOR.
D.A.MARSH
BY *Hudson and Young*
ATTORNEYS

United States Patent Office 3,028,970
Patented Apr. 10, 1962

3,028,970
CRYSTAL SEPARATION AND PURIFICATION
Donald A. Marsh, Bartlesville, Okla., assignor to Phillips Petroleum Company, a corporation of Delaware
Filed Aug. 21, 1958, Ser. No. 756,342
6 Claims. (Cl. 210—402)

This invention relates to the separation of components of liquid multi-component mixtures. In one aspect, it relates to the separation of components of liquid multi-component mixtures according to their freezing points in these mixtures. In another aspect, it relates to apparatus for the separation and purification of components of liquid multi-component mixtures by fractional crystallization. In still another of its aspects, it relates to apparatus for crystal separation and purification from liquid mixtures.

In the separation of components of liquid multi-component mixtures by crystallization methods, it is theoretically possible in many cases to obtain at least one of the components in substantially pure form in a single stage of operation. Accordingly, while distillation and solvent extraction methods of separation in theory would require infinite stages for a pure product, only one stage of crystallization should be required since crystals separating from a solution are presumed to have a definite composition. However, in actual practice, it has been found that the crystals obtained from a solution of several components are impure because of the occlusion of mother liquor within the crystal interstices.

The amount of mother liquor occluded or entrapped by the crystals formed is ordinarily so great that it is necessary to provide some method for the removal of the occluded impurities if a high purity product is to be obtained in a single crystallization stage. Recently, methods of separating a pure component from a mixture by crystallization have been proposed whereby the mixture to be separated is introduced into a heat exchange zone wherein a mixture of crystals and liquid is formed and that mixture is then introduced into an elongated purification chamber through which the crystals are moved as a compact mass. One such method for purifying crystals has been disclosed by J. Schmidt in Re. 23,810.

As disclosed by J. Schmidt in the above mentioned patent, a mass of crystals is moved through an elongated chamber to a melting zone wherein the crystals are melted. A portion of liquid corresponding to the melt is caused to move countercurrently through at least a portion of the crystal mass, thereby displacing occluded impurities from the crystal mass as it approaches the melting zone. The exact mechanism whereby this displacing liquid corresponding to the melt improves the purity of the final product is not completely understood. However, it is presently believed that the substantially pure material which is refluxed through at least a portion of the crystal mass displaces occluded impurities in the interstices of the crystals. At least a portion of the pure material is refrozen on the surface of the crystals. A high yield of product is obtained since the high melting product refreezes from the reflux stream as it comes into contact with the cold crystal mass moving toward the melting zone. Thus, the portion of the crystal mass which approaches the melting zone does not contain any appreciable amount of impurities, and the resulting product which is removed from the melting zone is of extremely high purity.

For the most efficient operation of such a purification system, it is very desirable to remove as much of the mother liquor as possible from the crystals prior to their introduction into the purification chamber. Operation in this manner results in the elimination of a portion of the impurities from the purification system before subjecting the crystals to the final purification step. This is usually accomplished in a preconcentration or prefilter zone which includes a filtering means for separating crystalline from non-crystalline material. A rotary vacuum filter has been found to be a particularly suitable filter for use in such a preconcentration zone for separating mother liquor from the crystals. However, one disadvantage in the use of a rotary filter lies in the fact that air from the atmosphere has a tendency to leak into the casing of the filter. The leakage of air seems to occur even though precautions are taken to ensure that the casing is tightly sealed. Air entering the filter casing usually contains moisture which during the filtering operation may freeze on the surface of the filter medium. Any ice crystals which form on the filter medium are difficult to remove by scraping and may result in damage to the filter. Furthermore, the presence of water in the system may cause damage to the chillers and to the heaters used in conjunction with the crystal purification columns. Thus, moisture present in the feed to the scraped surface chillers has a tendency to freeze and adhere strongly to the chilling surfaces and may cause damage to the scraper blades of the chiller. Springs attached to the scraper blades and pieces of scraper blades may be broken off and pass into the crystal purification column where they become lodged in the heating element positioned in the end of the column, causing it to burn out or to be otherwise damaged.

It is an object of this invention, therefore, to provide an improved rotary filter for use in a fractional crystallization system.

Another object of the invention is to provide a system for separating components of mixtures by fractional crystallization.

A further object of the invention is to provide an improved apparatus for separating components of liquid multi-component mixtures by fractional crystallization.

A still further object of the invention is to provide an improved rotary vacuum filter which includes means for preventing the entry into the filter of air containing moisture.

Other and further objects and advantages of the invention will become apparent to those skilled in the art upon consideration of the accompanying disclosure and the drawing, in which:

FIGURE 2 is a partial elevational view in section, showing details of the breathing device of the rotary vacuum filter;

FIGURE 3 is a schematic representation of another embodiment of the fractional crystallization system of this invention;

Figure 1:
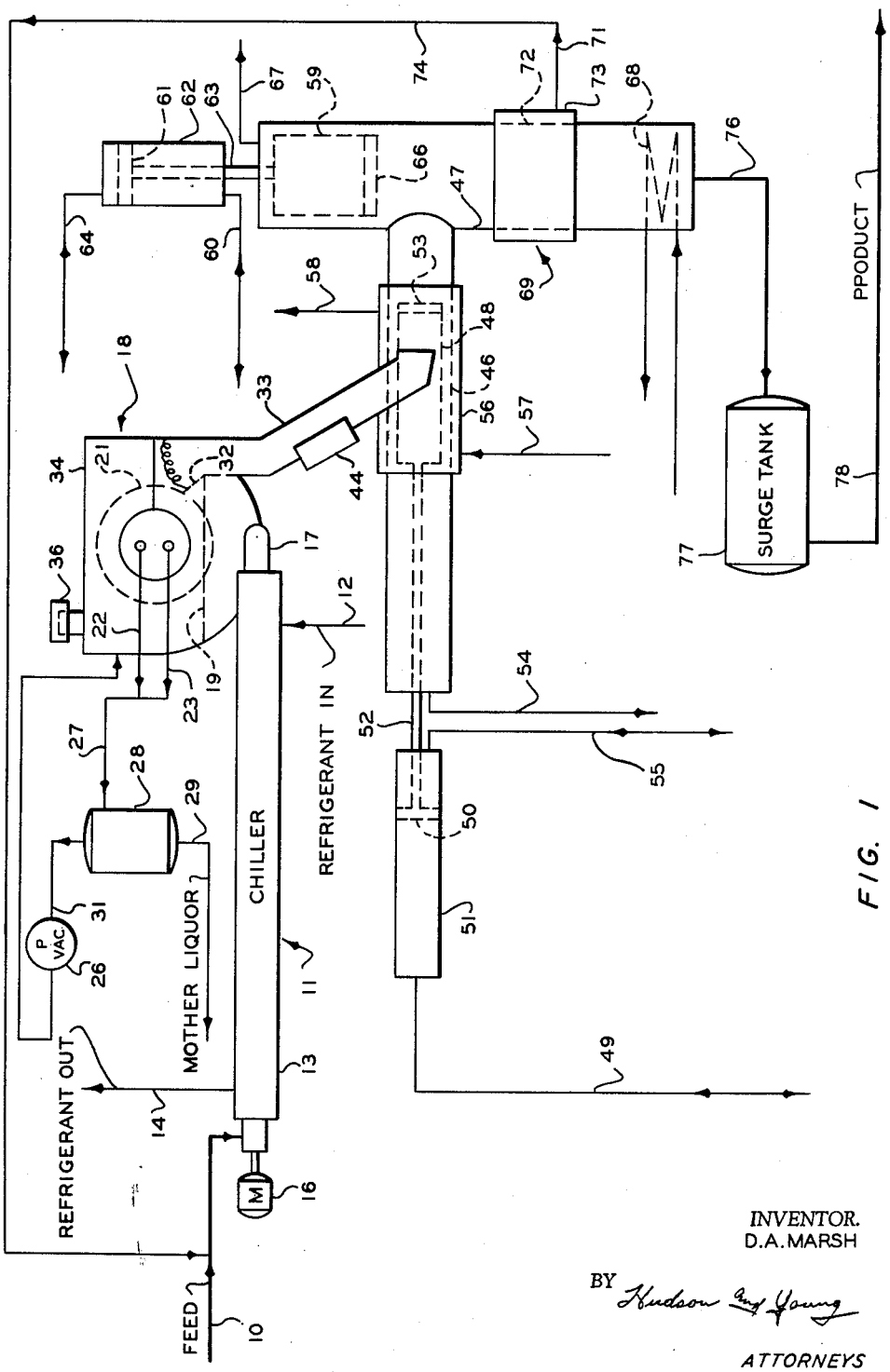
FIGURE 1 is a schematic representation of one embodiment of the fractional crystallization system of this invention.

Broadly speaking, the present invention is directed to a fractional crystallization apparatus for separating a component from a liquid multi-component mixture. In such apparatus which usually includes means for passing a slurry of crystals in mother liquor into a prefilter zone and therein separating at least a portion of the mother liquor from the slurry, introducing the resulting crystals and adhering mother liquor into a crystal purification zone, and recovering a purified product from that zone, the instant invention resides in the improvement which comprises carrying out the separation of mother liquor in the prefilter zone in the absence of substantially any moisture. In one embodiment of the invention, the prefilter zone is in the form of a rotary vacuum filter which is provided with a breathing device. The breathing device has a desiccant associated therewith so that moisture is removed from any air which may enter the filter. In another embodiment of the invention, air or other suitable inert gas is introduced into the rotary vacuum filter at a superatmospheric pressure so as to maintain a positive pressure therein, the air prior to its introduction into the filter being passed through a suitable desiccant so as to remove any moisture. By so maintaining a positive pressure in the filter, air containing moisture is prevented from entering the filter.

Although this invention is particularly applicable to systems in which the temperature at which crystals of the desired pure component form is considerably higher than the temperature to which the component is cooled in the liquid mixture to form crystals thereof, this procedure can be advantageously utilized in practically any system to which fractional crystallization is applicable so as to increase the efficiency of the process. This invention is applicable to the separations in many multicomponent systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a product purity upwards of 98 percent. In order to illustrate some of the systems to which the invention is applicable, the following compounds are grouped with respect to their boiling points.

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −124 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| CS₂ | 46.3 | −108.6 |
| Acetone | 56.5 | −95 |

| Group F | B.P., °C. | F.P., °C. |
|---|---|---|
| ortho-Xylene | 144 | −27.1 |
| meta-Xylene | 138.8 | −47.4 |
| para-Xylene | 138.5 | 13.2 |

| Group G | B.P., °C. | F.P., °C. |
|---|---|---|
| ortho-Cymene | 175.0 | −73.5 |
| meta-Cymene | 175.7 | <−25 |
| para-Cymene | 176.0 | −73.5 |

| Group H | B.P., °C. | M.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P. °C. |
|---|---|---|
| ortho-Nitrotoluene | 222.3 | α −10.6 β −4.1 |
| meta-Nitrotoluene | 231 | 15.5 |
| para-Nitrotoluene | 238 | 51.3 |

Systems consisting of any combination of two or more of the components within any one of the groups may be separated by the process of the invention, as well as systems made up of components selected from different groups; for example, benzene may be separated from a benzene-, n-hexane or n-heptane system in which the benzene is present in an amount greater than the eutectic concentration. In the same manner, para-xylene may be readily separated from a mixture of para- and meta-xylenes or from para-, meta-, and ortho-xylenes, or from a mixture of para-, meta-, and ortho-xylenes plus ethylbenzene and other compounds. Benzene may also be separated from admixture with toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone, (1,4-benzenediol), paracresol, para-dichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit and the like. Beverages, such as milk, wine, beer, coffee, tea, and various liquors, can also be concentrated in such a process. The process is also applicable to the concentration of vegetable juices.

A more comprehensive understanding of the invention can be obtained by referring to the drawing, particularly FIGURE 1 which illustrates one embodiment of the invention. The several embodiments of this invention are described hereinafter with reference to the recovery of para-xylene from a mixed xylene stream. However, it is to be understood that the invention is not limited to this particular system but is equally applicable to the separation of a great number of mixtures as mentioned hereinbefore. As seen in FIGURE 1, a mixed xylene feed stream is passed by means of line 10 into a scraped surface chiller 11. A suitable pump, not shown, supplies the feed to the process at a constant pressure. It is desirable that the crystallizable component in the feed mixture be present in an amount considerably greater than the eutectic composition of the feed mixture. Crystals formed from a mixture which is considerably richer in the crystallizable component than the eutectic composition are at a higher temperature than crystals formed from a leaner mixture and are more easily processed in subsequent purification steps. In the recovery of para-xylene from a feed mixture containing about 15 percent para-xylene, it is necessary to cool the mixture to about $-100°$ F. in order to crystallize a portion of the para-xylene present in excess of the eutectic composition. In a feed mixture containing ortho-xylene, meta-xylene and ethylbenzene in addition to para-xylene, the eutectic composition contains about 6 percent para-xylene. However, if the mixture contains about 60 percent para-xylene, it is only necessary to cool to about $-20°$ F. in order to crystallize a major portion of the para-xylene present. Although the process of this invention is operable when using fairly lean feed mixtures, it is preferred to have a feed which contains the crystallizable component in an amount considerably in excess of the eutectic composition. For example, it is desirable in the recovery of paraxylene to utilize a feed containing from 30 to 70 percent para-xylene. In order to obtain such a feed for the crystal purification column, it is desirable to employ a preconcentration or prefilter zone.

The temperature of the feed mixture in chiller 11 is adjusted so as to crystallize at least a portion of the crystallizable component in the mixture. Chiller 11 can be any conventional type of chiller which is supplied with a refrigeration means adequate to adjust the temperature of the mixture as hereinbefore described. For example, when a mixture of isomeric $C_8$ alkyl benzenes is fed through line 10 to chiller 11, that mixture is cooled to a temperature in the neighborhood of $-57$ to $-78°$ C. A cooling medium is passed via line 12 through a cooling jacket 13 and then removed therefrom through line 14 in order to accomplish the adjustment of the temperature of the feed mixture. Chiller 11 also includes a suitable scraper, not shown, which is rotated by a motor 16 so as to clean the inner walls of chiller 11 and to assist in passing the crystal slurry through the chiller and out through conduit 17.

The slurry of crystals in mother liquor, which is produced in chiller 11, is passed through conduit 17 into rotary vacuum filter 18. A constant level 19 of crystal slurry is maintained in the bottom of filter 18 by a suitable level sensing device, not shown, which controls the rate at which a slurry is introduced into the filter. The slurry level can also be maintained by hand control or by any other suitable arrangement of automatic controls. Filter 18 comprises a rotatable drum 21 which is partially immersed in the slurry of crystals in the bottom of the filter. A vacuum is applied to drum 21 by conduits 22 and 23. As drum 21 rotates through the slurry of crystals in the bottom of filter 18, a cake of crystals containing mother liquor is formed upon drum 21, and mother liquor is removed from this cake through conduits 22 and 23 by a vacuum pump 26. The liquid mother liquor is introduced by means of conduit 27 into a liquid-gas separator 28. The mother liquor is removed from separator 28 by means of line 29 while entrained gases are withdrawn from the separator through line 31. The entrained gases are subsequently returned to filter 18.

Drum 21 includes a filter medium or screen upon its outer surface upon which the cake of crystals is formed. The filter medium can be any suitable material, such as cloth, paper, glass fabric, felt, synthetic fabrics or perforated or porous metal or any combination of these or other filtering media as are necessary to effectively retain crystalline solids while permitting the passage therethrough of liquid during the filtration of crystal slurries. Filter 18 also includes a spring loaded scraper 32 which functions to remove crystals from rotating drum 21. As drum 21 rotates in a clockwise direction, the crystals are removed therefrom by scraper 32 and pass by means of conduit 33 to a crystal purification column in a manner to be described in detail hereinafter. Drum 21 is enclosed in a heavily insulated casing or housing 34. Even though every precaution may be taken to ensure that all joints and seams of the casing are tightly sealed, it has been found that air containing moisture still leaks into the filter casing. The moisture in this air freezes on the surface of the filter medium and after a period of time has a tendency to plug the filter medium. Furthermore, ice crystals forming on the filter medium are difficult to remove by scraping and often result in damage to the filter medium. In order to overcome this disadvantage of conventional rotary vacuum filters, the filter of this invention is provided with a breathing device 36. The breathing device permits air to freely enter the filter casing, thereby eliminating the leakage of air through the joints and seams of the casing. The breathing device has associated therewith a suitable desiccant which removes any moisture present in the air entering the filter through the breathing device. For the description of a rotary vacuum filter which can be modified to perform the process of this invention, reference may be made to "Elements of Chemical Engineering," Badger and McCabe, pages 484–487.

A better understanding of the breathing device with which filter 18 is provided can be obtained by referring to FIGURE 2 of the drawing. As seen in FIGURE 2, a conduit member, such as upright cylindrical member 37, is attached to the upper portion of casing 34. It is to be understood that it is not intended to limit the invention to an upright member which is cylindrical in shape. A member having, for example, a square or elliptical cross-section can be used just as well, and the member can be disposed in other than an upright position. Furthermore, the breathing device can be positioned in other locations than on the upper portion of casing 34, e.g., on the side of the casing, without departing from the scope of the invention. However, it is to be realized that the breathing device is positioned above the level of crystal slurry in the filter housing. Cylindrical member 37 is filled with a suitable desiccant 38, such as calcium chloride or silica gel. The desiccant rests on and is prevented from entering the filter casing by a suitable perforated member, such as screen 39, positioned in and attached to the lower end of cylindrical member 37. Portions of the upper end of cylindrical member 37 are cut away so as to provide openings 41 through which air can freely flow. Attached to and resting on the upper end of cylindrical member 37 is a weather shield or cap 42 which covers the open end of cylindrical member 37 and extends downwardly around openings 41. It is also within the scope of the invention to utilize in conjunction with cylindrical member 37 a replaceable tube which contains the desiccant. Such a tube readily permits the replacement of a desiccant saturated with water with a fresh supply merely by changing tubes in cylindrical member 37. It is seen that air entering tube 37 through openings 41 passes downwardly through the desiccant thereby removing any moisture from the air. By providing the breathing device, the tendency for air to leak into the filter through seams and joints is eliminated. In other words, any air entering the filter now flows through the breathing device which functions to remove any moisture present in the air. As a result, the formation of ice on the filter medium of the filter, the principal difficulty encountered when employing conventional rotary vacuum filters, is effectively prevented.

As previously mentioned, the crystals removed from the filter medium by scraper 32 pass downwardly through conduit 33. An electrical vibrator 44 may be attached to conduit 33 to aid the passage of the relatively dry crystals through the conduit. The crystals flowing through conduit 33 are introduced into a chamber 46 from which the crystals are moved directly into the upstream portion of a crystal purification column 47 by piston 48. Piston 48 is moved forward by the flow of a hydraulic fluid through conduit 49 acting against a piston 50, riding in cylinder 51 and connected to piston 48 by a piston rod 52. The movement of piston 48 continues until its forward face coincides with the side of purification column 47. Piston 48 is provided with a porous face 53 which allows liquid in the crystals in chamber 46 to pass therethrough and out of the chamber through conduit 54. Movement of piston 48 away from the side of the purification column so as to permit additional crystals to enter chamber 46 is accomplished by introducing hydraulic fluid into cylinder 51 through line 55. The action of the hydraulic fluid moves piston 50 which through piston rod 52 causes the movement of piston 48 toward the outer end of chamber 46.

It is desirable to supply crystals to purification column 47 at a temperature sufficiently high to prevent freezing of the crystal mass to an impervious plug in either column 47 or in chamber 46. To this end, a heating medium is passed through heating jacket 56, which encompasses chamber 46, by means of inlet line 57 and outlet line 58. During this heating operation, some of the crystals are melted in chamber 46. And when the crystalline material is contacted in chamber 46 by piston 48, at least a portion of this melt is removed from the chamber through line 54.

The crystals so introduced into purification column 47 are moved downwardly through the column as an elongated crystal mass by means of piston 59. Crystals enter the column when piston 59 is in a withdrawn or raised position and is not blocking the opening in the side of the column. Piston 59 is withdrawn by means of hydraulic fluid flowing through line 60 and acting against a piston 61 positioned in hydraulic cylinder 62 and connected to piston 59 by piston rod 63. The flow of fluid through conduit 64, which also acts on hydraulic piston 62, causes the movement of column piston 59 in a downstream direction. Piston 59 may also include a porous face 66 which permits the passage therethrough of liquid from the crystal mass as it is compacted by the piston. Liquid so removed from the crystal mass is withdrawn from column 47 through line 67.

As a result of the described operation, the crystals are moved downwardly through column 47 to a melting zone maintained in the lower end of the column by a suitable heating means 68. The heating means can be any type of heating device such as a coil as shown through which a heat exchange fluid is passed. An electrical heating element, which may be positioned either within or outside of column 47, can also be advantageously employed. A portion of the melt produced by the melting of crystals in the melting zone is displaced countercurrently to the movement of the crystals and through a portion of the crystal mass so as to displace impurities from the crystals. The impurities which are so displaced are removed from the column through a wall filter 69 having associated therewith an outlet conduit 71. The wall filter comprises a suitable filter medium 72, which can be a perforated portion of the column proper, surrounded by a jacket 73 to which conduit 71 is attached. Under certain conditions of operation, the concentration in the stream removed through conduit 71 of the product of the process is higher than its concentration in the feed mixture charged to the process through conduit 10. In this event, the material removed from column 47 through conduit 71 is passed through line 74 back to the feed mixture in line 10 wherein it is used to enrich the feed mixture. This type of operation results in the formation of larger crystals than can be formed from a feed mixture containing a lower concentration of the desired component. However, if the concentration of the desired component in the stream removed through conduit 71 is low as compared to the feed stream, the material so removed is not recycled to line 10.

Purified product is withdrawn from column 47 through line 76 and then flowed into surge tank 77. From the surge tank, the product is removed through line 78 and then passed to storage or any other suitable use.

Referring now to FIGURE 3 of the drawing, there is illustrated an alternative flow diagram of the crystal purification system of this invention. Identical reference numerals have been utilized to designate elements previously described in conjunction with FIGURE 1. In this embodiment of the invention, crystals flow downwardly from the rotary vacuum filter through conduit 33 and enter melt tank 81. The melt tank is provided with a suitable heat exchange means such as coil 82 through which a heat exchange medium is circulated. In the melt tank, the crystals are melted, and the resulting melt is pumped through line 83 into storage tank 84. When the feed material in storage tank 84 is desired for use, it is pumped into chiller 86 which is similar to scraped surface chiller 11 described with relation to FIGURE 1. The slurry of crystals in mother liquor formed in chiller 86 is passed into crystal purification column 47 which operates in the manner hereinbefore described.

When utilizing the system shown in FIGURE 3, it has been found to be particularly important to use the rotary vacuum filter of this invention. As mentioned hereinbefore, provision of the breathing device prevents the formation of ice crystals on the filter medium disposed on the rotating drum of the rotary filter. It is seen that if ice is allowed to accumulate on the drum, some of the ice would be included in the crystals removed from the filter through conduit 33. Furthermore, the melt recovered from melt tank 81 through line 83 would contain water which would be subsequently included in the material supplied to chiller 86. It has been found that the presence of water in the feed to such a chiller results in damage to the scraper blades of the chiller through the formation of ice on the chiller surfaces. This ice formation causes damage to the scraper blades with the result that springs attached to the scraper blades and pieces of the blades are sometimes passed into the purification column. These materials may become lodged in the heating means positioned in the lower end of purification column 47, causing the heater to burn out or to be otherwise damaged. By preventing moisture from entering the rotary vacuum filter, the instant invention obviates such breakdowns in the operation of the crystal purification system.

Figure 4:
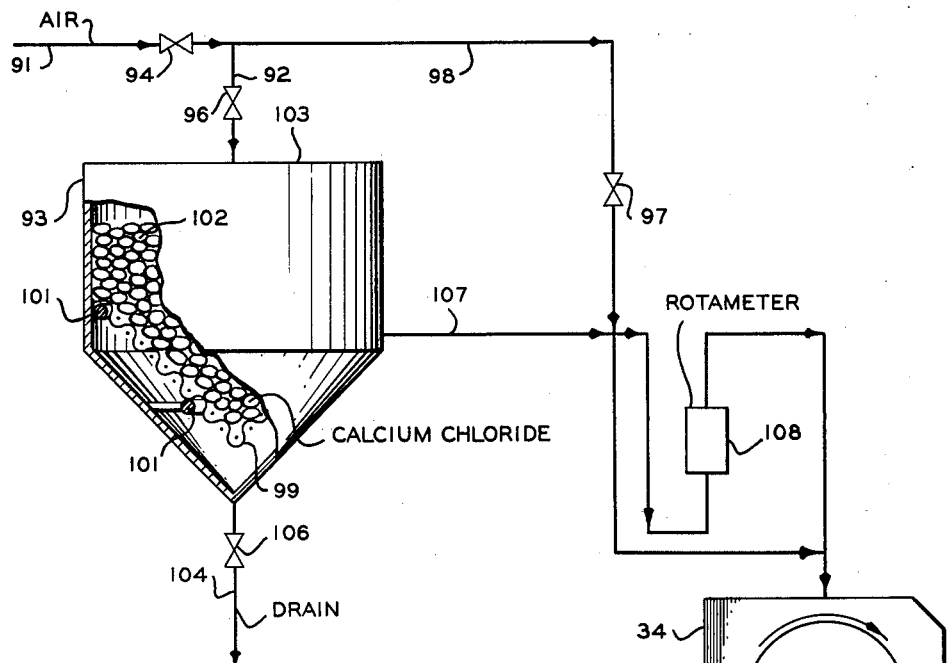
FIGURE 4 is a schematic representation illustrating a modification of the invention.

Referring now to FIGURE 4 of the drawing, there is illustrated an embodiment of the invention in which air or other suitable inert gas is supplied to rotary vacuum filter 18 at a superatmospheric pressure so as to maintain a positive pressure in the filter housing. In the apparatus of FIGURE 4, identical reference numerals are used to indicate elements previously described in conjunction with FIGURE 1. Plant air at a pressure, for example, of about 15 to 17 p.s.i. enters the system through line 91 and flows through line 92 into the upper portion of closed container 93. It is to be understood that an inert gas, such as nitrogen, can also be used. During this operation, valves 94 and 96 in lines 91 and 92 are open while valve 97 in bypass line 98 is closed. Container 93 has disposed therein a suitable desiccant, such as calcium chloride, which removes any moisture contained in the air. The upper portion of container 93 as shown in the drawing is cylindrical in shape while the lower portion thereof is conical. The calcium chloride is supported on a screen 99 or other suitable perforated material which is also conical in shape to conform to the lower portion of container 93. The upper edge of screen 99 is attached to the side of the cylindrical portion of container 93, and suitable support devices, such as rods 101 anchored to the side of the container, assist in supporting the screen in the container. It is noted that upper surface 102 of the calcium chloride is positioned below the upper closure member 103 of container 93 and that screen 99 is disposed above the lower conical portion of the container. Line 104 containing a valve 106 provides means for periodically removing any water which may collect in the bottom of the container.

On entering container 93, air passes downwardly through the bed of calcium chloride and is thereafter removed from the container through line 107. It is to be understood that valve 106 in line 104 is only open during periods when it is desired to drain water from container 93 and that it is normally closed when air is passing through the bed of calcium chloride. In passing through the bed of calcium chloride, any water contained in the air is removed so that dry air is removed from the container through line 107. The air is thereafter introduced into the upper portion of rotary filter 18. A rotameter 108 is provided in line 107 in order to furnish means for measuring the rate of flow of air through that line. Bypass line 98 is utilized during periods when it is desired to drain water from container 93 through line 104. During the draining operation, valve 96 in line 92 is closed while valve 97 in line 98 is opened. As a result, air entering the system through line 91 now passes through line 98 directly into filter 18 without flowing through the calcium chloride bed in container 93. However, the draining operation takes only a very short time so that no appreciable amount of moisture is introduced into the filter during this period.

As previously mentioned, the air introduced into filter 18 through line 107 is at a superatmospheric pressure. A positive pressure is thereby maintained in housing 34 of the rotary vacuum filter. Because of this positive pressure, atmospheric air containing moisture is prevented from leaking into the filter.

Figure 5:
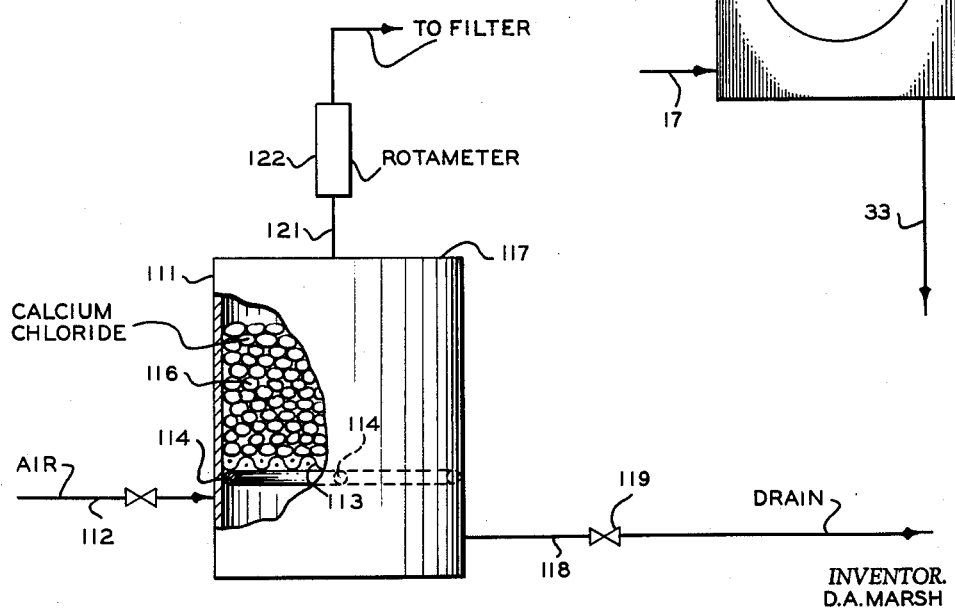
FIGURE 5 is a schematic representation showing another modification of the invention.

Another embodiment of the invention very similar to that of FIGURE 4 is illustrated in FIGURE 5. The embodiment shown in FIGURE 5 also provides means for supplying dry air at superatmospheric pressure to the casing of the rotary vacuum filter. Air or other suitable inert gas at a superatmospheric pressure is introduced into container 111 through line 112. Container 111 has positioned therein a bed of a suitable desiccant, such as calcium chloride, through which the air is passed prior to its introduction into the filter. The calcium chloride bed is supported in container 111 on a screen 113 which is in turn supported by means of suitable support members 114 attached to the walls of the container. It is noted that the bed of calcium chloride is positioned above the bottom of the container and above air inlet line 112 attached to the container. The upper surface 116 of the bed is positioned below upper closure member 117 of container 111. Line 118 provided with a valve 119 furnishes means for periodically draining water from the lower portion of container 111. On entering container 111, air passes upwardly through the bed of calcium chloride which serves to remove any moisture contained in the air. Thereafter, the air is removed from container 111 through line 121 and passes into rotary vacuum filter 18. A rotameter 122 is positioned in line 121 so as to provide means for measuring the rate of flow of air through that line. As mentioned in conjunction with FIGURE 4, the dry air introduced into the filter maintains a positive pressure therein and thereby prevents the entry of moisture laden air.

While the embodiments of this invention shown in FIGURES 4 and 5 differ somewhat from the embodiment illustrated in FIGURE 1, it is seen that they all accomplish the same purpose, i.e., the elimination of moisture in the casing of the rotary vacuum filter. Elimination of moisture in the filter makes it possible to operate the filter efficiently without clogging of the filter and without damage to the filter medium. Furthermore, the elimination of moisture from the feed material charged to the crystal purification column results in the removal of a damaging factor in the operation of the purification column. This is particularly true of the arrangement of apparatus shown in FIGURE 3 in which the material removed from the rotary vacuum filter is melted and then subsequently chilled before charging to the purification column. The presence of moisture in such a system may cause damage to the scraper associated with the chiller as well as to the heating element positioned in the purification column. However, the presence of moisture in the feed material to the purification column shown in FIGURE 1 may also have a deleterious effect on the chiller used in that system. Thus, it is seen from a consideration of the apparatus of FIGURE 1 that filtrate may under some circumstances be recycled through line 71 to feed inlet line 10. Any moisture contained in this stream may freeze on the surface of chiller 11 and cause damage to its scraper. It is, of course, to be understood that it is undesirable in any event to have water in the product recovered in the process and that its removal from the system results in a product having a higher degree of purity.

A more comprehensive understanding of the invention can be obtained by referring to the following illustrative example which is not intended, however, to be unduly limitative of the invention.

*Example*

In this example, apparatus similar to that shown in FIGURE 1 of the drawing is utilized to effect the separation of para-xylene from a crude xylene feed. A feed mixture comprising 17 weight percent para-xylene, 17.5 weight percent ortho-xylene, 33.4 weight percent meta-xylene, 27.5 weight percent ethylbenzene and 4.6 weight percent toluene is supplied to the chiller at the rate of 857 gallons per hour. Liquid filtrate material recovered from purification column 47 through line 71 attached to filter 69 contains about 40 percent para-xylene. This stream is recycled to feed line 10 through conduit 74 at the rate of 128 gallons per hour so that the total feed to the chiller is 985 gallons per hour. The total feed is cooled in chiller 11 to a temperature of −70° C., thereby forming a slurry containing about 15 percent solids. The resulting slurry of crystals in mother liquor is passed to rotary vacuum filter 18, and 769 gallons per hour of mother liquor containing about 6 weight percent para-xylene is removed from the filter through line 27. The crystals recovered from filter 18 are introduced into purification column 47 through chamber 46 in the form of a slurry of crystals and mother liquor. The feed which is supplied to purification column 47 at the rate of 216 gallons per hour is in the form of a slurry containing 40 weight percent solids.

Purification column piston 59 is moved by means of hydraulic piston 61 in such a manner that the compacting stroke of the piston requires from 20 to 40 seconds while the retracting stroke takes from 3 to 5 seconds. Heat is added to the end portion of the purification column by means of heating means 63 so as to maintain the end of the column at a temperature of about 27° C. Displaced material is withdrawn from the column through filter 69 and line 71 at the rate of 128 gallons per hour at a temperature of about −10° C. The melted portion is removed from the purification column through line 76 at the rate of 88 gallons per hour and at a temperature of about 27° C. The product removed through line 76 contains about 99 percent by weight para-xylene.

During the above described operation, any air passing into rotary vacuum filter 18 enters through breathing device 36. Since the breathing device is provided with calcium chloride through which the air must pass, only dry air enters the filter. As a result of the elimination of moisture from the filter, there is no formation of ice crystals on the drum of the filter, and the filter operates effectively throughout the run without any plugging of the filter medium.

It will be apparent to those skilled in the art that variations and modifications of the invention can be made upon study of the foregoing disclosure. Such variations and modifications are clearly believed to be within the spirit and scope of the invention.

I claim:

1. An improved filter system which comprises an enclosed housing; a rotatable drum positioned in said housing; a filter medium disposed on said drum; means for removing liquid from crystals on said filter medium; means for removing crystals from said filter medium; a conduit member attached to said housing above the level of any material therein, said conduit member being open so as to permit free passage of air from the atmosphere into said housing; and a desiccant disposed in said conduit member so that any air passing into said housing through said conduit member flows through said desiccant.

2. An improved filter system which comprises an enclosed housing; a rotatable drum positioned in said housing; a filter medium disposed on said drum; means for removing liquid from crystals on said drum; means for removing crystals from said filter medium; a cylindrical member having one end attached to an upper portion of said housing and communicating with the interior of said housing; at least one opening formed in the side of the outer end of said cylindrical member; a perforated member positioned in the bottom of said cylindrical member adjacent said housing; a desiccant disposed in said cylindrical member and resting on said perforated member; and a shielding means attached to the outer end of said cylindrical member, said shielding means including a plate member positioned on the outer end of said cylindrical member and sides of greater diameter than said cylindrical member attached to said plate member and encompassing said opening in said cylindrical member.

3. An improved filter system which comprises an enclosed housing; a rotatable drum positioned in said housing; a filter medium disposed on said drum; means for removing liquid from crystals on said drum; means for removing crystals from said filter medium; a closed container; a perforated member attached to the walls of an intermediate portion of said container; a desiccant disposed in said container and resting on said perforated member; a gas inlet means attached to one end of said container; a gas outlet means attached to the opposite end of said container, said gas outlet means being further connected to said housing; establishing open communication between the atmosphere and a gas space in said housing; and a liquid outlet line connected to the lower end of said container below said perforated member.

4. An improved filter system which comprises an enclosed housing; a rotatable drum positioned in said housing; a filter medium disposed on said drum; means for removing liquid from crystals on said drum; means for removing crystals from said filter medium; a closed container comprising a cylindrical upper portion and a conical lower portion with the apex of said conical lower portion extending downwardly; a conical perforated member attached to the walls of said cylindrical portion of said container, said perforated member being positioned so that its sides are spaced apart from said conical lower portion of said container; a desiccant disposed in said container and resting on said conical perforated member; a gas inlet means connected to the upper end of said container; a gas outlet means connected to said container below where said conical perforated member is attached to the walls of said cylindrical portion of said container, said gas outlet means being further connected to said housing; establishing open communication between an external atmosphere and a gas space in said housing; and a liquid outlet line connected to said container at the apex of said conical lower portion.

5. An improved filter system which comprises an enclosed housing; a filtering means positioned in said housing; means for removing liquid from crystals on said filtering means; means for removing crystals from said filtering means; a conduit member attached to said housing above the level of any material therein, said conduit member being open so as to permit free passage of air from the atmosphere into said housing, and a desiccant disposed in said conduit member so that any air passing into said housing through said conduit member flows through said desiccant.

6. An improved filter system which comprises an enclosed housing; a filtering means positioned on said housing; means for removing liquid from crystals on said filtering means; means for removing crystals from said filter means; a cylindrical member having one end attached to an upper portion of said housing and communicating with the interior of said housing; at least one opening formed in the side of the outer end of said cylindrical member; a perforated member positioned in the bottom of said cylindrical member adjacent said housing; a desiccant disposed in said cylindrical member and resting on said perforated member; and a shielding means attached to the outer end of said cylindrical member, said shielding means including a cap member positioned on the outer end of said cylindrical member and encompassing said opening in said cylindrical member.

References Cited in the file of this patent

UNITED STATES PATENTS

| | | |
|---|---|---|
| 1,512,321 | Wait | Oct. 21, 1924 |
| 2,081,296 | Gard | May 25, 1937 |
| 2,107,664 | Gee | Feb. 8, 1938 |
| 2,148,770 | Mittendorf | Feb. 28, 1939 |
| 2,747,001 | Weedman | May 22, 1956 |
| 2,756,568 | Jordan | July 31, 1956 |
| 2,809,884 | Ratje | Oct. 15, 1957 |
| 2,921,682 | White | Jan. 19, 1960 |